United States Patent [19]

Mitsui et al.

[11] Patent Number: 5,356,587
[45] Date of Patent: Oct. 18, 1994

[54] PROCESS FOR PRODUCING HOSE HAVING CONNECTING PORTION

[75] Inventors: Kenichi Mitsui; Hajime Ogawa; Seiji Takada, all of Inazawa, Japan

[73] Assignee: Toyoda Gosei Co., Ltd., Nishikasugai, Japan

[21] Appl. No.: 959,917

[22] Filed: Oct. 14, 1992

[30] Foreign Application Priority Data

Oct. 14, 1991 [JP] Japan .................. 3-265059
Oct. 14, 1991 [JP] Japan .................. 3-265066
Oct. 14, 1991 [JP] Japan .................. 3-265068

[51] Int. Cl.$^5$ ............................................. B29C 45/00
[52] U.S. Cl. .................................. 264/263; 264/328.1; 264/328.9; 425/116; 425/149; 425/542
[58] Field of Search .................. 264/263, 328.9, 328.1; 425/116, 129.1, 542, 149

[56] References Cited

U.S. PATENT DOCUMENTS

| | | | |
|---|---|---|---|
| 3,458,619 | 7/1969 | Prochaska | 264/263 |
| 3,938,774 | 2/1976 | Smith | 264/263 |
| 4,490,315 | 12/1984 | Charlebois et al. | 264/328.9 |
| 4,650,220 | 3/1987 | Grabowski | 264/263 |
| 4,867,663 | 9/1989 | Woerner et al. | 264/328.9 |
| 5,003,775 | 4/1991 | Leistritz | 60/313 |

FOREIGN PATENT DOCUMENTS 60-241595 11/1985 Japan .

Primary Examiner—Jan H. Silbaugh
Assistant Examiner—Christopher A. Fiorilla
Attorney, Agent, or Firm—Cushman, Darby & Cushman

[57] ABSTRACT

A process for producing a hose having a connecting portion includes the steps of a connecting step, and a molding step. In the molding step, a dividable mold is employed in which a first sealing member and a second sealing member are retained so as to form a sealing ring. The sealing ring firmly retains a hose in the mold without pinching and damaging it. Further, the mating surfaces of the first sealing member and the second sealing member are disposed so as to deviate from the center of the sealing ring. Furthermore, a chucking member adapted for locally pressing the hose is disposed adjacent to the sealing ring. Moreover, a recessing portion communicating with the cavity of the mold by way of a narrow passage is formed and the first minimum pressure of the molding material, enabling to pass through the narrow passage, is set less than the sealing pressure exerted between the sealing ring and the hose and is set more than the second minimum pressure thereof, enabling to inhibit the short shot failures.

8 Claims, 12 Drawing Sheets

PROCESS FOR PRODUCING HOSE HAVING CONNECTING PORTION

BACKGROUND OF THE INVENTION

1. Field of the Invention

The present invention relates to a hose having a connecting portion and a process for producing the same. The connecting portion is constructed so that a pipe and the hose are connected integrally with a resin coating portion. The present invention is applicable to a branched hose such as an automotive radiator hose or the like.

2. Description of the Related Art

There has been a connecting construction for a hose which is disclosed in U.S. Pat. No. 5,033,775, for instance. As illustrated in FIG. 16, this conventional hose connecting construction includes a branched pipe 100 branched in three directions, hoses 201, 202 and 203 disposed around each of the branched sleeves of the branched pipe 100, and a resin coating portion 300 covering the connecting portions between the hoses 201, 202 and 203 and the branched pipes 100.

In order to build the conventional hose connecting construction, the branched sleeves of the branched pipe 100 are inserted into the hoses 201, 202 and 203 respectively. Thereafter, the branched pipe 100 with the hoses 201, 202 and 203 installed (hereinafter simply referred to as an "insert assembly") is disposed in a mold 400 as illustrated in FIG. 17, and the outer peripheral surfaces of the hoses 201, 202 and 203 are pressed and sealed with sealing rings 401, 402 and 403 at the ends of the branched sleeves of the branched pipe 100, thereby fixing the insert assembly. Then, a molten resin is filled in a cavity 500, which is formed by the molding surface of the mold 400, the sealing rings 401, 402 and 403 and the insert assembly by injection molding, and thereby a resin coating portion 300 is molded around the connecting portions and the central portion of the branched pipe 100. During the injection molding, the resin coating portion 300 is solidified and shrunk by a molding shrinkage ratio of 0.5% or more, and accordingly each of the hoses 201, 202 and 203 is subjected to an injection molding pressure as well as a force reducing their diameters. As a result, the hoses 201, 202 and 203 are held firmly between the resin coating portion 300 and the branched pipe 100, and accordingly a high sealing pressure can be exerted between the hoses 201, 202 and 203 and the branched pipe 100.

However, in the conventional production process described so far, the hoses 201, 202 and 203 (i.e., resilient bodies) are held and retained with the sealing rings 401, 02 and 03. Consequently, there arises a phenomenon that the insert assembly disposed in the mold 400 is moved slightly over a distance of about 0.8 mm by the injection molding pressure during the injection molding. When the insert assembly is thusly moved, the thickness of the molded resin coating portion 300 is likely to become uneven, and flashes occur on the resin coating portion 300. In order to avoid these drawbacks, it is necessary to retain the insert assembly in the mold 400 with a much firmer retaining force.

Here, Japanese Unexamined Patent Publication (KOKAI) No. 241,595/1985 also discloses a method for retaining the insert assembly in the mold. In the method, a tab protruding from a surface of the branched pipe is disposed on the surface of the branched pipe, and it is brought into contact with a molding surface of the mold, whereby retaining the insert assembly in the mold. By using the method, it is possible to securely inhibit the insert assembly from moving. However, it becomes hard to cover the end surface of the tab with the resin coating portion, and accordingly there arises anxiety that the sealing property between the hoses and the branched pipe is liable to be dissatisfactory.

Further, in the aforementioned conventional production process, when the dimensions of the hoses 201, 202 and 203 or the like are changed, the capacity of the cavity 500 should be varied accordingly. Namely, when the molding material is injected in a greater amount, the molding material leaks between the sealing rings 401, 402 and 403 and the hoses 202 and 203, and thereby flashes occur on the resin coating portion 300. On the other hand, when the molding material is injected in a lesser amount, the molding material fails to fill the cavity 500 of the mold 400 completely (hereinafter simply referred to as "short shot failures"). Therefore, it is necessary to precisely determine the optimum injection amounts whenever the dimensions of the hoses 201, 202 and 203 or the like are changed. As a result, in the aforementioned conventional production process, the manhour requirement tends to increase, and accordingly the productivity tends to deteriorate.

SUMMARY OF THE INVENTION

The present invention has been developed in view of the circumstances described above. It s therefore an object of the present invention to provide a hose having a connecting portion and a process for producing the same in which the sealing property between a hose and a branched pipe is satisfied, and in which an insert assembly is inhibited from moving without damaging the hose by pinching with a sealing ring. It is a further object of the present invention to provide a process for producing a hose having a connecting portion in which the flashes and the short shot failures are inhibited from happening with a minimum increment in the manhour requirement in spite of the fluctuations in the dimensions of the hose or the like.

According to one aspect of the present invention, a process for producing a hose having a connecting portion comprises the steps of a connecting step of connecting a hose and a pipe by inserting an end of the pipe into the hose, and a molding step of disposing the pipe with the hose connected in a mold and molding a resin coating portion integrally coating a connecting portion between the hose and the pipe, the mold comprising mold halves, one of the mold halves including a first sealing member disposed on a molding surface thereof and another mold halves including a second sealing member disposed on a molding surface thereof, the first sealing member and the second sealing member forming a Sealing ring adapted for holding and sealing around an entire periphery of the hose when they are combined, wherein mating surfaces of the first sealing member and the second sealing member is disposed so as to deviate from the center of the sealing ring toward the second sealing member, and the first sealing member and the second sealing member are combined after the first sealing member retains the hose in the molding step.

Further, according to another aspect of the present invention, a process for producing a hose having a connecting portion comprises the steps of a connecting step of connecting a hose and a pipe by inserting an end of the pipe into the hose, and s molding step of disposing the pipe with the hose connected in a mold and molding a resin coating portion integrally coating a connecting portion between the hose and the pipe, the mold comprising mold halves, one of the mold halves including a first sealing member disposed on a molding surface thereof and another mold halves including s second sealing member disposed on a molding surface thereof, the first sealing member and the second sealing member forming s sealing ring adapted for holding and sealing around an entire periphery of the hose when they are combined, wherein the mold further comprises a chucking member disposed therein and adjacent to the sealing ring and adapted for pressing the hose radially, inwardly and locally in a peripheral direction, whereby firmly retaining the hose.

Furthermore, according to still another aspect of the present invention, a process for producing a hose having a connecting portion comprises the steps of a connecting step of connecting a hose and a pipe by inserting an end of the pipe into the hose, and a molding step of disposing the pipe with the hose connected in a mold and molding a resin coating portion integrally coating a connecting portion between the hose and the pipe, the mold comprising mold halves, one of the mold halves including a first sealing member disposed on a molding surface thereof and another mold halves including a second sealing member disposed on a molding surface thereof, the first sealing member and the second sealing member forming a sealing ring adapted for holding and sealing around an entire periphery of the hose when they are combined, wherein the mold further comprises a narrow passage communicating with a cavity of the mold and a recessing portion communicating with the cavity of the mold by way of the narrow passage, and a first minimum pressure of a molding material, enabling the molding material to pass through the narrow passage, is set so that it is less than a sealing pressure exerted between the sealing ring and the hose and it is more than a second minimum pressure of the molding material, enabling to inhibit short shot failures, in the cavity of the mold, whereby evacuating an excess of the molding material to the recessing portion by way of the narrow passage after the cavity of the mold is filled completely.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
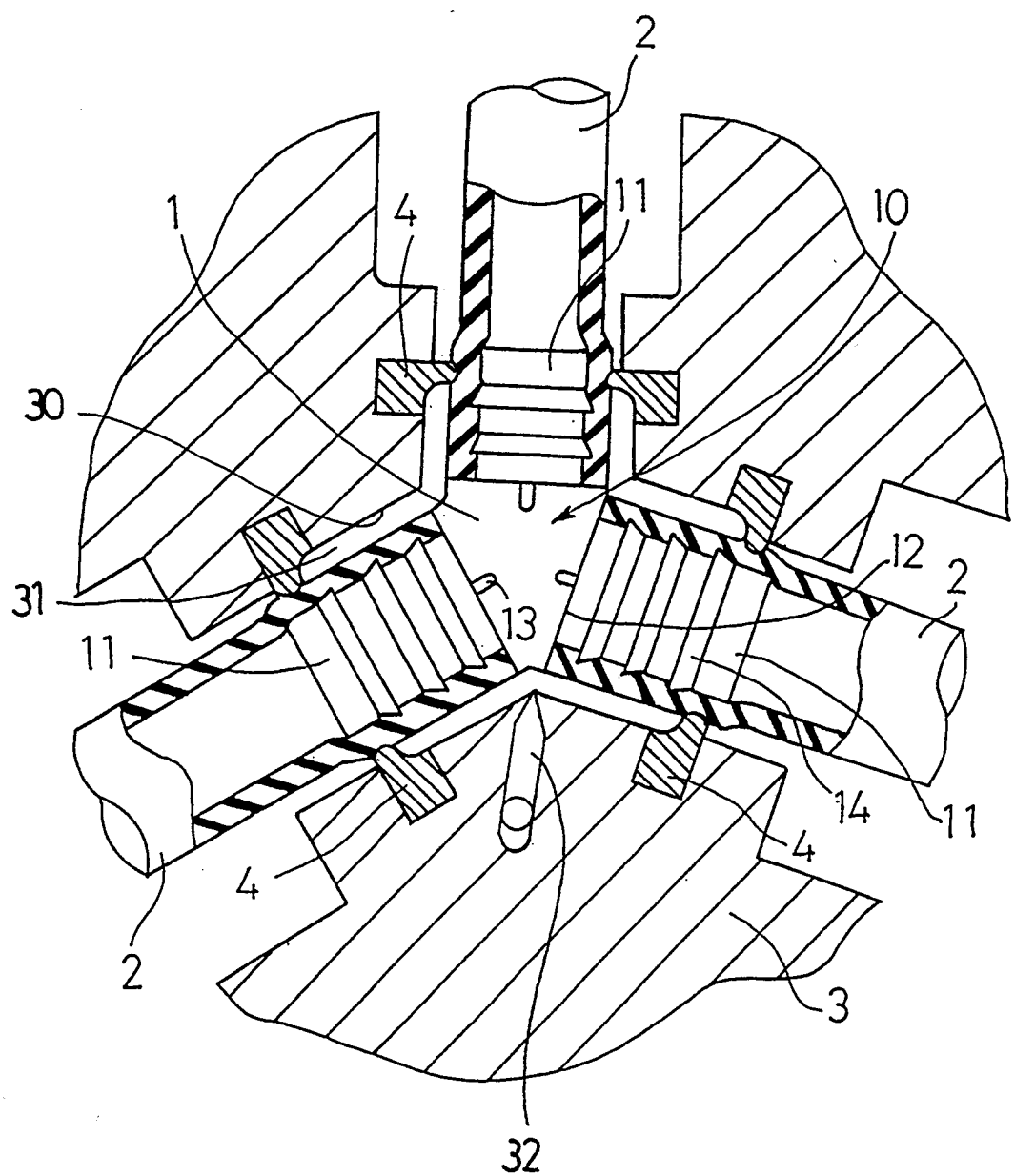
FIG. 1 is an explanatory cross sectional view for illustrating a state in which a pipe with hoses connected (hereinafter simply referred to as an "insert assembly") is disposed in a mold in a First Preferred Embodiment according to the present invention.

The one aspect of the present invention is characterized by the construction of the sealing ring. Namely, the sealing ring is divided into two members, e.g., the first sealing member and the second sealing member, and the mating surfaces of the first sealing member and the second sealing member are disposed so as to deviate from the center of the sealing ring toward the second sealing member. Thus, the construction of the sealing ring enhances the retaining force for retaining the insert assembly in the mold, and it enables to hold the hose so as to seal between the sealing ring and the hose with a clamping pressure.

When the first and second sealing members are combined on their mating surfaces, they form a ring shape so as to hold the hose, thereby inhibiting a molding material from leaking between the sealing ring and the hose and at the same time molding an end surface of the resin coating portion with a surface of the sealing ring.

Further, when an inner diameter of the sealing ring is adjusted to be smaller than an outer diameter of the hose with a branched sleeve of the pipe inserted, the sealing ring comes to retain the hose firmly in the mold. However, when setting an inner diameter of the sealing ring, care should be taken not to pinch and damage the hose with the dividing portions or mating surfaces of the first sealing member and the second sealing member.

Furthermore, when the mating surfaces of the first sealing member and the second sealing member are disposed so as to deviate from the center of the sealing ring toward the second sealing member, the first sealing member and the second sealing member are formed in substantially semicircle shapes, and the semicircle shape of the first sealing member has a depth or height which is larger than that of the second sealing member.

Moreover, when an inner configuration of the sealing ring is formed in a circle shape, the first sealing member is likely to be formed in a substantially letter "C" shape. Accordingly, in the first sealing member, the inner surface ends continuing from the mating surface go inwardly respectively so that it might be hard to dispose the hose therein. In order to avoid this sort of shortcomings, it is preferred to form the configurations of the first sealing member adjacent to the mating surface in a linear shape extending in the combining direction. If such is the case, it is also preferred to form the configurations of the second sealing member adjacent to the mating surface in a shape continuing smoothly from the configurations of the first sealing member adjacent to the mating surface. For instance, an overall configuration of the sealing ring can be formed in a track shape which includes a pair of parallelly disposed linear portions and a pair of arc portions connecting the linear portions on the both sides.

In the case that the first sealing member and the second sealing member are constructed as described above, the first sealing member first holds the hose, and then the second sealing member is combined with the first sealing member in the molding step, thereby sealing between the hose and the sealing ring. When combining thusly, the hose is placed in the first sealing member so that most of the hose periphery is accommodated in the first sealing member, and the second sealing member is put on the first sealing member so as to cover it. As a result, the hose is hardly pinched and damaged by the dividing portions or mating portions of the first sealing member and the second sealing member. Although the first sealing member and the second sealing member can be formed directly on the molding surface of the mold, they can be made independently and retained detachably on the molding surface of the mold. This latter arrangement is preferred because it enables to select the configurations of the first sealing member and the second sealing member with an improved degree of designing freedom.

In the one aspect of present invention, the construction of the sealing ring thus differs from that of the conventional production process, however, the connecting step and the molding step can be carried out in an identical manner therewith. Also, the materials of the pipe, the hose and the resin coating portion can be selected from a variety of materials as having been done in the conventional production process.

As having been described so far, according to the one aspect of the present invention, the sealing ring is divided into the first sealing member and he second sealing member, and the mating surfaces of the first sealing member and the second sealing member are disposed so as to deviate from the center of the sealing ring toward the second sealing member. Consequently, when the hose is first retained in the first sealing member, the hose is placed in the first sealing member so that most of the hose periphery is accommodated in the first sealing member, and the second sealing member is put on the first sealing member so as to cover it. As a result, the hose is hardly pinched and damaged by the dividing portions or mating surfaces of the first sealing member and the second sealing member. Here, in the case that the configurations of the first sealing member adjacent to the mating surface are formed in a linear shape, an opening of the first sealing member becomes wider so that the hose retaining operation can be carried out with ease and the hose is further inhibited from being damaged in the molding step.

Hence, in accordance with the one aspect of the present invention, the hose is inhibited from being pinched by the dividing portions or mating surfaces of the first sealing member and the second sealing member even when the inner diameter of the sealing ring is reduced to the most extent, and the insert assembly is securely inhibited from moving. As a result, the thickness of the resin coating portion becomes uniform, and at the same time the flashes can be inhibited from occurring on the resin coating portion. In addition, since the connecting portion between the hose and the pipe is thus covered with the resin coating portion over the entire surface satisfactorily, there arises no anxiety that the sealing property between the hose and the pipe is liable to be dissatisfactory.

The another aspect of the present invention is characterized by the chucking member employed by the mold. Namely, the sealing member seals the hose around the entire periphery, and at the same time the chucking member retains the hose in the mold in the molding step. Specifically speaking, it is not necessary to firmly retain the hose with the sealing ring, and accordingly the hose is inhibited from being pinched by the dividing portions or mating surfaces of the first sealing member and the second sealing member. Further, the chucking member is not required to give a sealing property between itself and the hose,. and accordingly it can retain the hose by pressing the hose radially, inwardly and locally in a peripheral direction. Thus, the hose is hardly pinched by the chucking member.

In order to retain the hose by pressing it radially, inwardly and locally in a peripheral direction with the chucking member, the chucking member can be, for instance, divided into two members, and a polygon-shaped concave portion can be formed in each of the two members. With this kind of construction, the parts of the polygon-shaped concave portions, corresponding to the sides of the polygon, contact with the hose tangentially, and thereby the chucking member can press the hose locally. Further, the resilient portions of the hose are displaced by the pressing, and they are accommodated in the parts of the polygon-shaped concave portions, corresponding to the corners of the polygon. Thus, the hose is also inhibited from being pinched by the dividing portions or mating surfaces of the chucking member. Here, it is preferred to avoid the parts of the polygon-shaped concave portions, corresponding to the sides of the polygon, being positioned at the dividing portions or mating surfaces of the chucking member, but to position the parts of the polygon-shaped concave portions, corresponding to the corners of the polygon, at the dividing portions or mating surfaces of the chucking member. With this extra construction, the hose is inhibited from being pinched by the dividing portions or mating surfaces of the chucking member further satisfactorily. Although the polygon-shaped concave portions can be disposed symmetrically in the dividable chucking member, it is preferred to dispose the center of them so as to deviate from the center of the chucking member rearward in a working direction of the injection pressure. This latter arrangement enables to further inhibit the insert assembly from moving. In addition, it is preferred to chamfer the surfaces of the chucking member as well as the surfaces of the sealing ring which are brought into contact with the hose.

In the another aspect of the present invention, other than the chucking member thus constructed is employed, the connecting step and the molding step can be carried out in an identical manner with the conventional production process. Also, the materials of the pipe, the hose and the resin coating portion can be selected from a variety of materials as having been done in the conventional production process.

As having been described so far, according to the another aspect of the present invention, the sealing ring gives the sealing property between itself and he hose, and the chucking member retains the hose so that the hose can withstand the injection molding pressure. That is to say, the sealing ring is required to press the hose with such a force that the molten resin is inhibited from leaking between itself and the hose during the molding of the resin coating portion, and accordingly the sealing ring is not required to firmly hold the hose. As a result, the hose is hardly pinched and damaged by the dividing portions or mating surfaces of the first sealing member and the second sealing member of the sealing ring.

On the other hand, the chucking member is not required to contribute to the sealing property. In other words, the chucking ring can be made to press the hose radially, inwardly and locally in a peripheral direction, and thereby the portions of the resilient parts of the hose displaced by the pressing can be accommodated in the spaces provided in the chucking member other than the locally pressing portions. Consequently, the chucking member can press the hose with a heavy force without pinching the hose, and it can retain the insert assembly firmly in the mold.

Hence, in accordance with the another aspect of the present invention, the sealing property between the sealing ring and the hose is fully satisfied, and the insert assembly is securely inhibited from moving without pinching the hose. As a result, the thickness of the resin coating portion becomes uniform, and at the same time the flashes can be inhibited from occurring on the resin coating portion.

The still another aspect of the present invention is characterized by employing the mold in which the recessing portion communicating with the cavity of the mold by way of the narrow passage is formed. With the mold thus constructed and by adjusting the configuration of the narrow passage, the first minimum pressure of the molding material, enabling the molding material to pass through the narrow passage, is set so that it is less than the sealing pressure exerted between the sealing ring and the hose and it is mot than the second minimum pressure of the molding material, enabling to inhibit the short shot failures, in the cavity of the mold.

To put it differently, when th narrow passage is narrower and provides a high fluidic resistance, the first minimum pressure of the molding material, enabling the molding material to pass through the narrow passage increases. On the other hand, when the narrow passage is wider and provides a low fluidic resistance, the first minaimum pressure decreases. Since the sealing pressure exerted between the sealing ring and the hose as well as the second minimum pressure of the molding material, enabling to inhibit the Short shot failures, in the cavity of the mold can be determined definitely, the configuration of the narrow passage can be designed so that the first minimum pressure of the molding material, enabling the molding material to pass through the narrow passage, is less than the sealing pressure exerted between the sealing ring and the hose and it is more than the second minimum pressure of the molding material, enabling to inhibit the short shot failures, in the cavity of the mold.

With the narrow passage thus designed, the molding material comes to pass through the narrow passage before it passes between the sealing ring and the hose. Consequently, the flashes can be inhibited from occurring on the resin coating portion. In addition, since .he molding material never enters the recessing portion before it fills up the cavity completely, namely, since it escapes through the recessing portion after it fills up the cavity completely, the short shot failures can be securely inhibited from occurring when an injection capacity is set in an excessive amount.

According to the still another aspect of the present invention, the mold which further Comprises the recessing portion communicating with the cavity of the mold by way of the narrow passage is employed, and the first minimum pressure of the molding material, enabling the molding material to pass through the narrow passage, is set so that it is less than the sealing pressure exerted between the sealing ring and the hose and it is more than the second minimum pressure of the molding material, enabling to inhibit the short shot failure, in the cavity of the mold by adjusting the configuration of the narrow passage. Consequently, when injecting the molding material into the cavity of the mold by injection molding or the like, and when setting the injection capacity in an excessive amount, the molding material first fills up the cavity and thereafter the molding pressure increases in the cavity.

As aforementioned, the first minimum pressure of the molding material, enabling the molding material to pass through the narrow passage, is set so that it is more than the second minimum pressure of the molding material, enabling to inhibit the short shot failure, in the cavity of the mold. Consequently, the molding material is inhibited from passing through the narrow passage before it fills up the cavity completely. Further, the first minimum pressure of the molding material, enabling the molding material to pass through the narrow passage, is set so that it is less than the sealing pressure exerted between the sealing ring and the hose. Hence, there arises no drawback that the molding material leaks between the sealing ring and the hose before it passes through the narrow passage.

All in all, the short shot failures are securely inhibited from occurring. The excessive molding material, which exerts a pressure over the second minimum pressure, passes through the narrow passage, and it is accommodated in the recessing portion without leaking between the sealing ring and the hose. Thus, even when the injection capacity is set in an excessive amount, the flashes are securely inhibited from occurring on the resin coating portion. In addition, since an upper limit of the pressure in the cavity is regulated by the first minimum pressure of the molding material, enabling the molding material to pass through the narrow passage, it is unnecessary to control the pressure in the cavity.

Here, the resulting molded body is provided with a convex portion which is formed by the narrow passage and the recessing portion. However, the convex portion can be broken manually with ease because a part of the convex portion, which is formed by the narrow passage, has a thin plate shape usually. Consequently, no great man-hour requirement is required to remove the convex portion.

Hence, in accordance with the still another aspect of the present invention, even when the capacity of the cavity is varied by the fluctuations in the dimensions of the hose or the like, the variation of the cavity capacity can be offset within the capacity size of the recessing portion. In addition, since the flashes are securely inhibited from occurring on the resin coating portion despite the injection capacity set in an excessive amount, the molding step can be carried out with the injection capacity which enables to inhibit the short shot failures from occurring.

Having generally described the present invention, a further understanding can be obtained by reference to the specific preferred embodiments which are provided herein for purposes of illustration only and are not intended to limit the scope of the appended claims.

First Preferred Embodiment

FIG. 1 illustrates a mold employed in the First Preferred Embodiment together with an insert assembly. As illustrated in FIG. 1, an insert assembly 10 includes a branched pipe made of glass fiber reinforced polyamide resin and branched in three directions, and three hoses 2 with each of branched sleeves 11 of the branched pipe 1 inserted thereinto in a connecting step described below. Further, the branched pipe 1 includes a thick-walled central portion 12 from which the branched sleeves 11 are branched in the three directions.

Connecting Step

In a connecting step, the hoses 2 are disposed around each of the branched sleeves of the pipe. Since an outer diameter of the branched sleeves re formed in a dimension which is larger than an inner diameter of the hoses 2, the hoses 2 are disposed around the surfaces of the branched sleeves with their diameters expanded, and they are positioned in the axial direction in the disposing operation when they are brought into contact with the end surfaces of the central portion 12 of the pipe 1. Further, a positioning groove 13 is formed in each of the three end surfaces of the central portion 2. The hoses 2 are positioned in the peripheral direction in the disposing operation when markings (not shown) formed on the hoses 12 are aligned with the positioning grooves 13. Furthermore, a plurality of ring-shaped protrusion streaks 14 are formed so as to go around in the peripheral direction on outer peripheral surfaces of the branched sleeves 1, and they work to inhibit the hoses 2 from coming off.

Molding Step

The insert assembly 10 thus constructed is disposed in a mold 3. The mold 3 includes an upper mold half and a lower mold half. FIG. 1 illustrates the lower mold half. In this mold 3, sealing rings 4 are retained at positions where the end portions of the branched sleeves are disposed.

Figure 2:
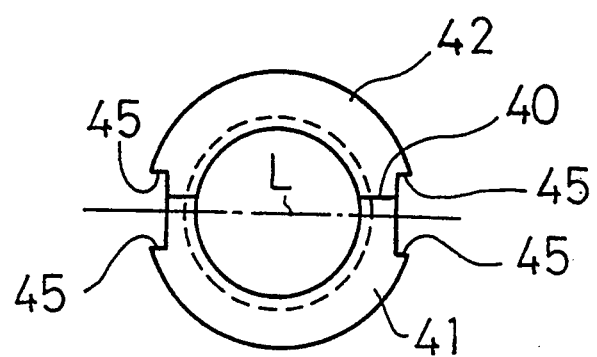
FIG. 2 is a plan view of a sealing ring which is employed in the First Preferred Embodiment.
Figure 3:
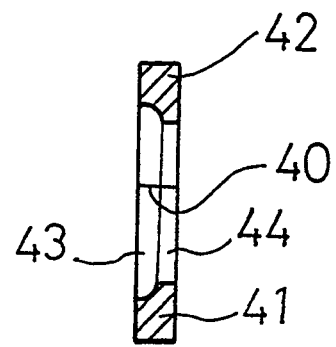
FIG. 3 is a cross sectional view of the sealing ring illustrated in FIG. 2.
Figure 4:
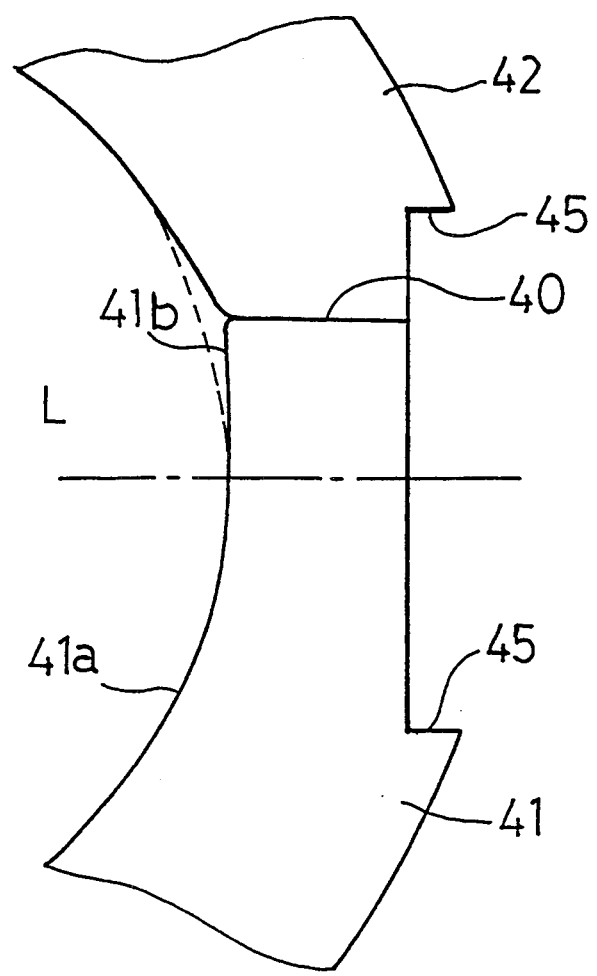
FIG. 4 is an enlarged explanatory plan view of the major portions of the sealing ring illustrated in FIG. 2.

Here, as illustrated in FIGS. 2 and 3, the sealing ring comprises a first sealing member 4 and a second sealing member 42. Mating surfaces 40 of the first sealing member and the second sealing member 42 are disposed so as to deviate from the center of the sealing ring 4 toward the second sealing member 42. Specifically speaking, as illustrated FIG. 4 (i.e., a partly enlarged view of the sealing ring 4 illustrated in FIG. 2), an inner peripheral surface of the first sealing member 41 includes a semicircle-shaped arc portion 41a, and a linear portion 41b linearly extending from an end of the arc portion 41a to the second sealing member 42. Further, the mating surfaces 40 of the first sealing member 41 and the second sealing member 42 are disposed so as to deviate from the center line "L" toward the second sealing member 42 in a distance of $0.1 \times$ an inner diameter (in mm) of a smaller-diameter portion 44 later described approximately. In other words, a length of the linear portion 41b is $0.1 \times$ an inner diameter (in mm) of a smaller-diameter portion later described approximately. Moreover, an inner peripheral surface of the second sealing member 42 is bent at an end so as to smoothly continue from the linear portion 41b of the first sealing member 41. Additionally, the mating surfaces 40 of the first sealing member 41 and the second sealing member 42 are chamfered at their inner peripheral corners.

Here, a central hole is formed when the first sealing member 41 and the second sealing member 42 are combined at the mating surfaces 40. As illustrated in FIG. 3, the central hole includes a larger-diameter portion 3 and a smaller-diameter portion 44, and it has a substantially circle shape in two stages. An inner diameter of the smaller-diameter portion 44 is set so that it is slightly smaller than an outer diameter of the hose 2 disposed around the branched sleeve 11 of the insert assembly 10. In addition, cut-off portions 5 are formed on the side surfaces at the ends of the first sealing member 41 and the second sealing member 42, and they engage with parts of the upper and lower mold halves of the mold 3, thereby detachably retaining the first sealing member 41 and the second sealing member 42 in the mold 3.

In the molding step, the hoses 2 whose diameters are expanded by the ends of the branched sleeves are retained with the first sealing members 41. Since the opening of the first sealing member 41 defined by the linear portions 41b are maximum diameters of the first sealing member 44, the hoses 2 can be disposed in the first sealing members 41 with ease when the hoses 2 are retained therein. Moreover, since the corners of the mating surfaces 40 defining the opening of the first sealing members 4 are chamfered, the hoses 2 can be inhibited from being damaged.

Then, the second sealing members 42 are combined with the first sealing members 4 so as to constitute the sealing rings 4. Since the hoses 2 have been already accommodated in the parts of the first sealing members 41 where the maximum widths (or the maximum inner diameters)arise in the parallel direction to the mating surfaces 40, and since the second sealing members 42 are put on the first sealing members 41 so as to cover them, the hoses 2 are inhibited from being pinched by the mating surfaces 40. Since the inner peripheral surfaces of the smaller-diameter portions 44 of the sealing rings 4 are brought into contact with the hoses 2 when the first sealing members 41 and the second sealing members 42 are combined, and since the inner diameters of the smaller-diameter portions 44 are set slightly smaller than the portions of the hoses 2 with their diameters expanded, the hoses 2 are held in the mold 3 so that they are reduced in their diameters and that they are sealed in a water proof manner. Moreover, since the larger-diameter portions 43 of the sealing rings 4 are disposed so as to face the central portion 12 of the pipe 1, they continue from the molding surface of the mold 3 so as constitute a part of the molding surface. Consequently, as illustrated in FIG. 1, there is formed a cavity 31 in a space of the mold 3 which is surrounded by the molding surface 30 of the mold 3, the ends of the hoses 2, the central portion 12 of the pipe and the larger-diameter portions 43 of the sealing rings 4.

Thereafter, the molten resin is injected into the cavity through a gate 32. During the injection of the molten resin, an injection molding pressure is applied to the insert assembly 0 in the mold 3. However, since the sealing rings 4 firmly retain the insert assembly 10, the insert assembly 10 is inhibited from moving. Consequently, the sealing rings 4 closely contact with the hoses 2 nd seal between themselves and the hoses 2, and thereby the flashes are inhibited from occurring on the resin coating portion. Moreover, the resulting resin coating portion is uniform in thickness entirely.

Finally, the molten resin injected into the cavity 31 heavily presses the hoses 2 with the injection molding pressure and the shrinkage resulting from cooling, and it brings them into pressing contact with the branched sleeves 11 of the pipe 1. Hence, in accordance with the First Preferred Embodiment of the present production process, a branched hose in which the hoses 2 are firmly connected with he branched pipe 1 can be produced easily in a uniform thickness around the resin coating portion and free from flashes thereon.

Figure 5:
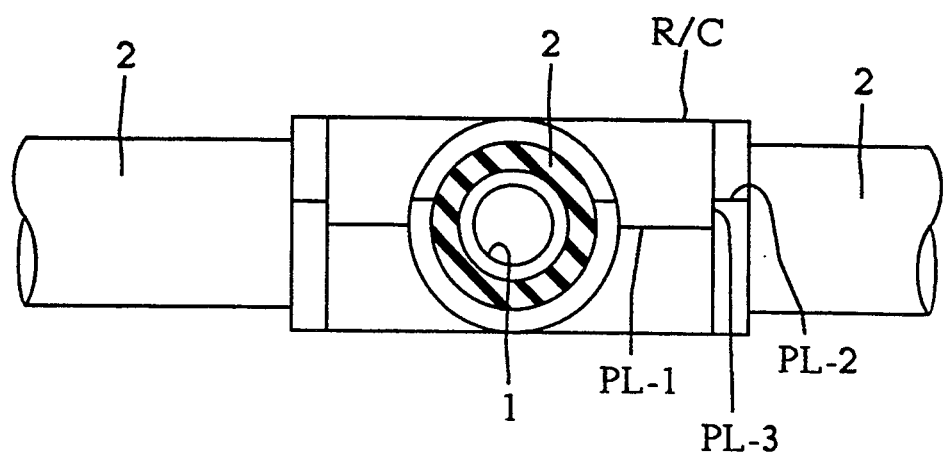
FIG. 5 is a plan view of a hose having a connection produced in accordance with the First Preferred Embodiment.

FIG. 5 illustrates a plan view of the branched thus produced in accordance with the First Preferred Embodiment. As can be seen from FIG. 5, the branched hose produced by the First Preferred Embodiment has the resin coating portion "R/C" on which parting lines appear in two stages, i.e., a first parting line "PL-1" which runs along the central axes, a second parting line "PL-2" which runs away from the central axes, and a third parting line "PL-3" which goes around the resin coating portion "R/C" at the ends, and a part of which connects the first parting line "PL-1" and the second parting line "PL-2."

Second Preferred Embodiment

The Second Preferred Embodiment of the present production process will be hereinafter described with reference to FIGS. 6 to 11. As can be seen from FIG. 6, an insert assembly 10 processed into a branched hose by the Second Preferred Embodiment has an identical construction with that of the First Preferred Embodiment, and accordingly it will not be described in detail herein. Further, component members having similar constructions and operations with those of the First Preferred Embodiment will be hereinafter described with the same reference numbers.

Connecting Step

Figure 6:
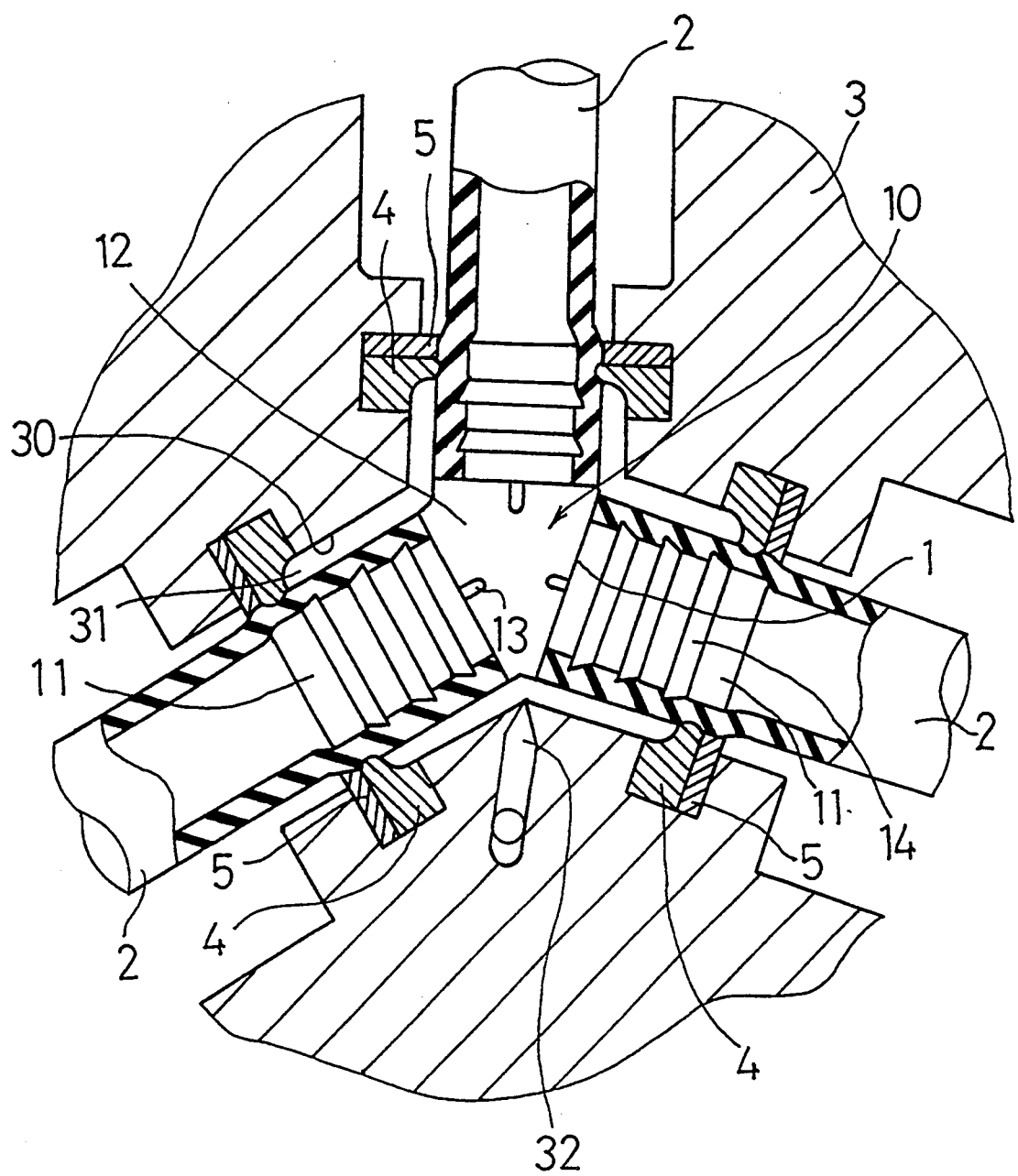
FIG. 6 is an explanatory cross sectional view for illustrating a state in which an insert assembly is disposed in a mold in a Second Preferred Embodiment according to the present invention.

As can be understood from FIG. 6, the hoses 2 are disposed around and connected with each of the branched sleeves 11 of the pipe 1 in an identical manner with that of the First Preferred Embodiment, and accordingly it will not be described in detail herein.

Molding Step

The insert assembly 0 constructed in the same manner as that of the First Preferred Embodiment is disposed in a mold 3. The mold 3 includes an upper mold half and a lower mold half which have a substantially identical construction with that of the First Preferred Embodiment. FIG. 6 also illustrates the lower mold half. In this mold 3, sealing rings 4 and chucking rings 5 are retained at positions where the end portions of the branched sleeves are disposed. The chucking rings 5 are disposed adjacent to and outside the sealing rings 4.

Figure 7:
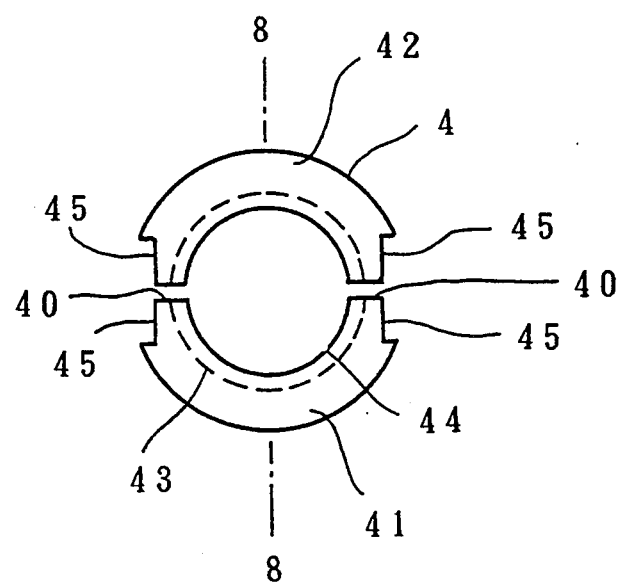
FIG. 7 is a plan view of a sealing ring which is employed in the Second Preferred Embodiment.
Figure 8:
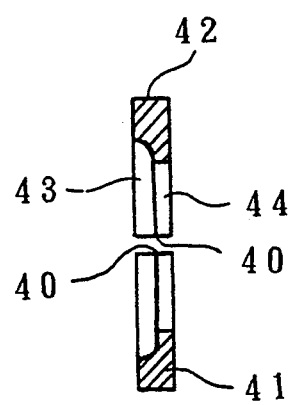
FIG. 8 is a cross sectional view of the sealing ring illustrated in FIG. 7 taken along the line 8—8.

Here, as illustrated in FIGS. 7 and 8, the sealing ring 4 comprises a first sealing member 44 and a second sealing member 42 which are divided symmetrically top and bottom, and which form a ring shape when they are combined. Further, a central hole is formed when the first sealing member 41 and the second sealing member 42 are combined at the mating surfaces 40. As illustrated in FIG. 8, the central hole includes a larger-diameter portion 43 and a smaller-diameter portion 44, and it has a substantially circle shape in two stages. An inner diameter of the smaller-diameter portion 44 is set so that it is identical with an outer diameter of the hose 2 disposed around the branched sleeve 1 of the insert assembly 10. In addition, cut-off portions 5 are formed on the side surfaces at the ends of the first sealing member 44 and the second sealing member 42, and they engage with parts of the upper and lower mold halves of the mold B, thereby detachably retaining the first sealing member 41 and the second sealing member 42 in the mold 3.

Figure 9:
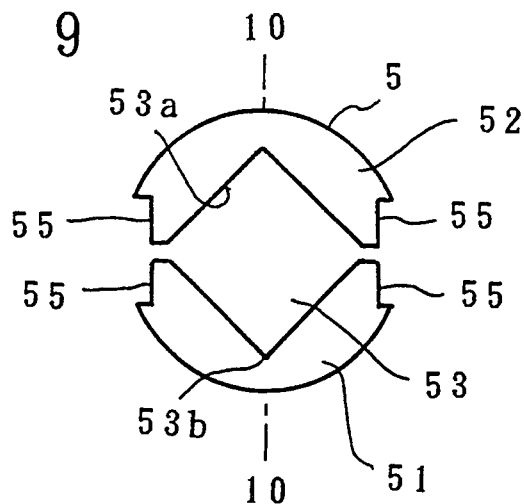
FIG. 9 is a plan view of a chucking ring which is employed in the Second Preferred Embodiment.
Figure 10:
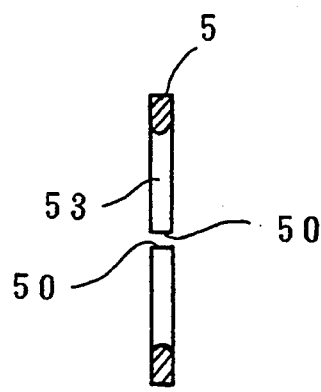
FIG. 10 is a cross sectional view of the chucking ring illustrated in FIG. 9 taken along the line 10—10.

Moreover, as illustrated in FIGS. 9 and 10, the chucking ring 5 comprises a first chucking member 51 and a second chucking member 52 which are divided symmetrically top and bottom, and which form a ring shape when they are combined. Further, a central hole 53 is formed in a rhombic shape when the first chucking member 51 and the second chucking member 52 are combined at mating surfaces 50, and the corners of the rhombic shape are positioned so as to direct the mating surfaces 50. A diameter of a circle which inscribes with the central hole 53 is set so that it is smaller than an outer diameter of the hose 2 disposed around the branched sleeve 11 of the insert assembly 10 by 5%. Further, as illustrated in FIG. 10, the inner peripheral surfaces of the central holes 53 are rounded or chamfered. In addition, cut-off portions 55 are formed on the side surfaces at the ends of the first chucking member 51 and the second chucking member 52 where they coincide with the cut-off portions 5 of the sealing ring 4, and they engage with parts of the upper and lower mold halves of the mold 3, thereby detachably retaining the first chucking member 51 and the second chucking member 52 in the mold 3.

When the upper and the lower mold halves of the mold 3 are combined, the sealing rings 4 are disposed around portions of the hoses 2 where their diameters expanded by the ends of the branched sleeves 11 of the pipe 1, and thereby the inner peripheral surfaces of the sealing rings 4 are brought into contact with the hoses 2 in a water proof manner so as to seal between themselves and the hoses 2. Since the inner diameters of the smaller diameter portions 44 are set identical with the portions of the hoses 2 with their diameters expanded, there hardly occurs the problems that the hoses 2 are pinched by the mating surfaces 40, and accordingly the hoses 2 are inhibited from being damaged. Moreover, since the larger-diameter portions 43 of the sealing rings 4 are disposed so as to face the central portion 12 of the pipe 1, they continue from the molding surface of the mold 3 so as constitute a part of the molding surface.

Figure 11:
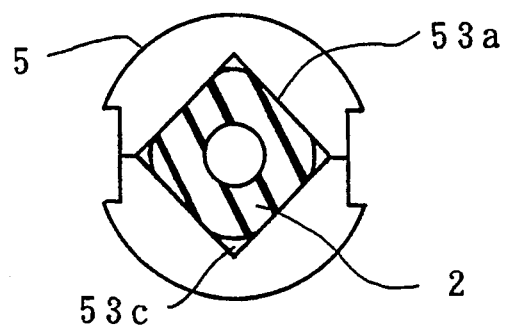
FIG. 11 is an explanatory plan view of the chucking ring illustrated in FIG. 9 which holds a hose.
Figure 12:
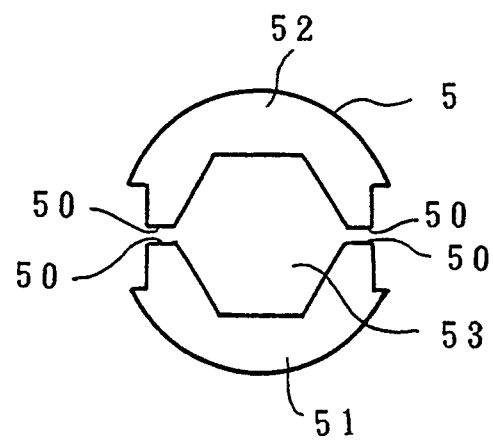
FIG. 12 is a plan view of a chucking ring which is employed in a Third Preferred Embodiment according to the present invention.

The chucking rings 5 are disposed adjacent to and outside the sealing rings . In the central holes 53 of the chucking rings 5, the hoses 2 which are disposed around the branched sleeves 11 and whose diameters are expanded by the branched sleeves 11 are held with a clamping pressure. As described above, since the diameters of the circles which inscribe with the central holes 53 are smaller than the outer diameters of the hoses 2 expanded by the branched sleeves 11, the four sides 53a of the central holes 53 press and firmly retain the hoses 2 therein as illustrated in FIG. 11. In addition, since the portions of the resilient parts of the hoses 2 displaced by the pressing are accommodated in the four corners 53c of the central holes 53, the hoses 2 are inhibited from being pinched by the mating surfaces 50 of the first chucking member 51 and the second chucking member 52. The insert assembly 10 is thus retained and fixed in the mold 3. Consequently, as illustrated in FIG. 6, there is formed a cavity 3 in a space of the mold 3 which is surrounded by the molding surface 30 of the mold 3, the ends of the hoses 2, the central portion 2 of the pipe 1 and the larger-diameter portions 43 of the sealing rings 4.

Thereafter, the molten resin s injected into the cavity 31 through a gate 32. During the injection of the molten resin, an injection molding pressure is applied to the insert assembly 10. However, since the chucking rings 5 firmly retain the insert assembly 10, the insert assembly 10 is inhibited from moving. Consequently, the sealing rings 4 and the insert assembly 10 do not move relatively to each other. Thus, the sealing rings closely contact with the hoses 2 and seal between themselves and the hoses 2, and thereby the flashes are inhibited from occurring on the resin coating portion. Moreover, the resulting resin coating portion is uniform in thickness entirely.

Finally, the molten resin injected into the cavity heavily presses the hoses 2 with the injection molding pressure and the shrinkage resulting from cooling, and it brings them into pressing contact with the branched sleeves 11 of the pipe Hence, also in accordance with the Second Preferred Embodiment of the present production process, a branched hose in which the hoses 2 are firmly connected with the branched pipe can be produced easily in a uniform thickness around the resin coating portion and free from flashes thereon.

Third Preferred Embodiment

The Third Preferred Embodiment of the present production process is a modified version of the Second Preferred Embodiment, and it is identical therewith other than the configuration of the central hole 53 of the chucking ring 5. Namely, instead of the chucking ring 5 having the rhombic shape employed in the Second Preferred Embodiment, a chucking ring 5 having a variety of polygon shapes can be employed. Specifically speaking, a chucking ring 5 having a hexagonal shape as illustrated in FIG. 2 is employed in the Third Preferred Embodiment. The Third Preferred Embodiment operates and produces the same advantageous effect as those of the Second Preferred Embodiment. Accordingly, the operations and the advantageous effects will not be described in detail herein.

Here, it is necessary to position the corners of the hexagonal central hole 53 of the chucking ring 5 so as to direct the mating surfaces 50 because the pinching by the mating surfaces 50 might occur when the sides of the hexagonal central hole 53 is positioned at the mating surfaces 50 as earlier mentioned for the rhombic shape central hole 53 of the chucking ring 5 in the Second Preferred Embodiment.

Fourth Preferred Embodiment

Figure 13:
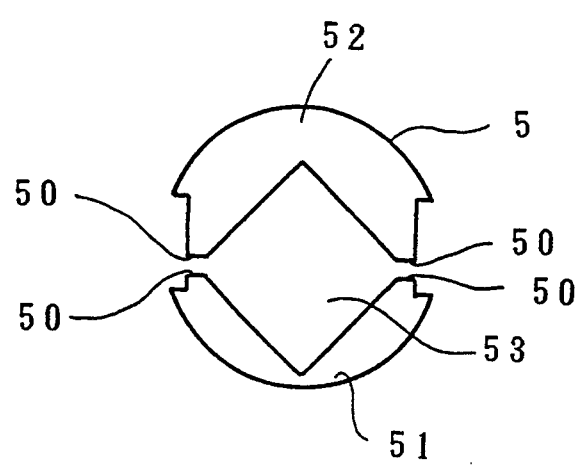
FIG. 13 is a plan view of a chucking ring which is employed in a Fourth Preferred Embodiment according to the present invention.

The Fourth Preferred Embodiment of the present production process is a further modified version of the Second Preferred Embodiment, and it is identical there- with other than how the chucking ring 5 is divided. Namely, instead of the chucking ring 5 which is divided into the first chucking member 51 and the second chucking member 52 symmetrically top and bottom, a chucking ring 5 which is divided into a first chucking member 51 and a second chucking member 52 asymmetrically top and bottom can be employed. Specifically speaking, a chucking ring 5 in which the center of the central hole 53 is disposed so as to deviate from the axial center of the hose 2 toward a first chucking member 51 by 0.5 mm approximately as illustrated in FIG. 13 is employed in the Fourth Preferred Embodiment (however, note that the deviation is illustrated exaggeratedly in the drawing).

With the chucking ring 5 thus constructed, the hoses 2 are subjected to four different pressing forces at the four sides of the rhombic shape central hole 53 of the chucking ring 5 when the insert assembly 0 is disposed in the mold 3. Consequently, the insert assembly 0 is displaced before injecting the molten resin. Here, the direction of this displacement is adjusted so that it is opposite with respect to the direction of the displacement resulting from the injection of the molten resin, and accordingly the displacement of the insert assembly 10 is further reduced than the displacement reduction effected in the Second Preferred Embodiment during the molding step. Other than this operation and advantageous effect, the Fourth Preferred Embodiment operates and produces the same advantageous effect as those of the Second Preferred Embodiment. The same operations and the advantageous effects will not be described in detail herein.

Fifth Preferred Embodiment

The Fifth Preferred Embodiment of the present production process will be hereinafter described with reference to FIGS. 14 and 15. As can be seen from FIG. 4, an insert assembly 10 processed into a branched hose by the Fifth Preferred Embodiment has an identical construction with that of the First Preferred Embodiment, and accordingly it will not be described in detail herein. Further, component members having similar constructions and operations with those of the First Preferred Embodiment will be hereinafter described with the same reference numbers.

In the Fifth Preferred Embodiment, a mold 3 includes an upper mold half and a lower mold half which have a substantially identical construction with that of the First Preferred Embodiment. FIG. 14 also illustrates the lower mold half. In this mold 3, sealing rings 4 are retained around the outer peripheries of the hoses 2 into which the end portions of the branched sleeves 11 are inserted. The sealing rings 4 are divided into two members which are retained in the upper mold half and the lower mold half respectively and which are combined to form a ring shape when the mold 3 is clamped. Consequently, as illustrated in FIG. 14, there is formed a cavity 31 in a space of the mold 3 which is surrounded by a molding surface 30 of the mold 3, the insert assembly 10 and the sealing rings 4.

Figure 14:
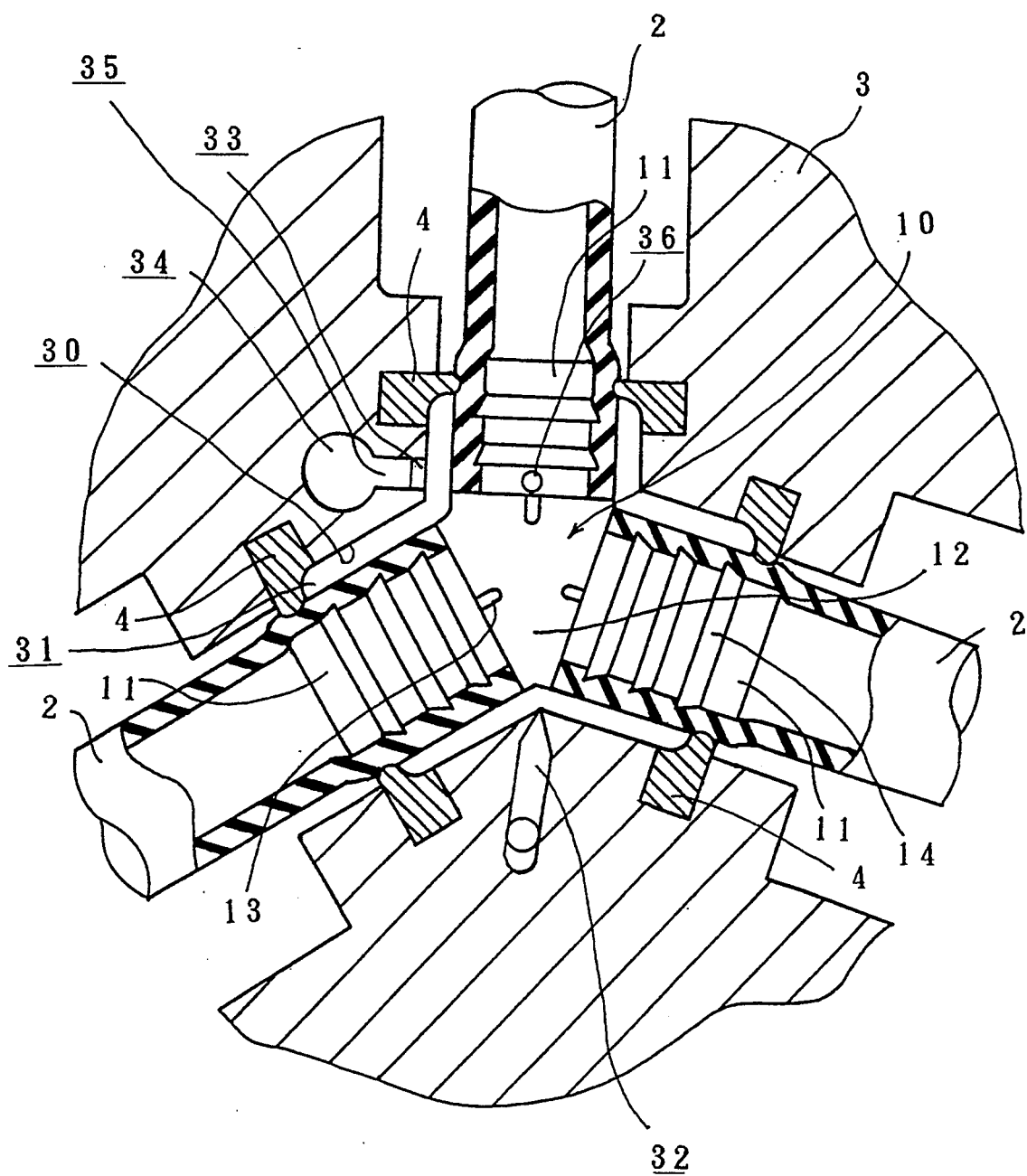
FIG. 14 is an explanatory cross sectional view for illustrating a state in which an insert assembly is disposed in a mold in a Fifth Preferred Embodiment according to the present invention.
Figure 15:
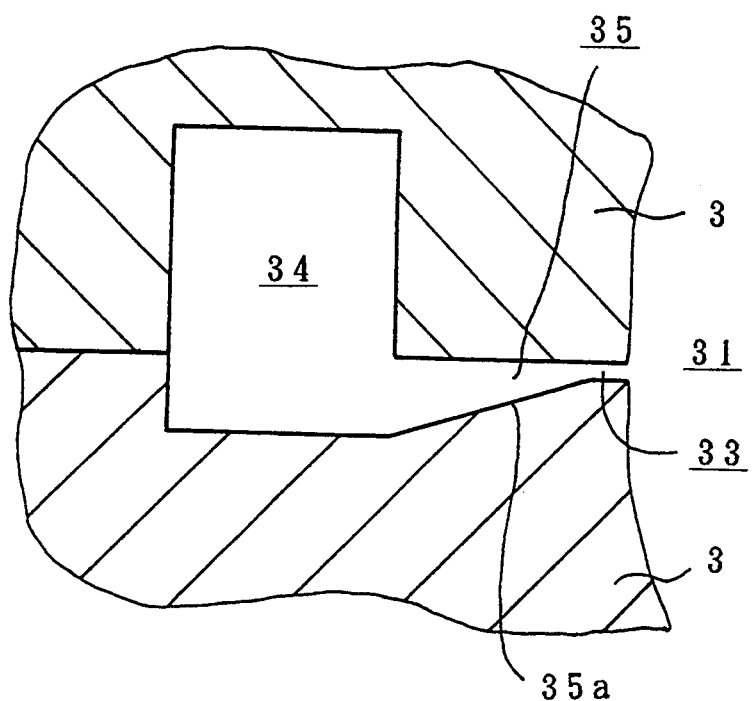
FIG. 15 is an enlarged cross sectional view of a narrow passage and a recessing portion of the mold in the Fifth Preferred Embodiment.
Figure 16:
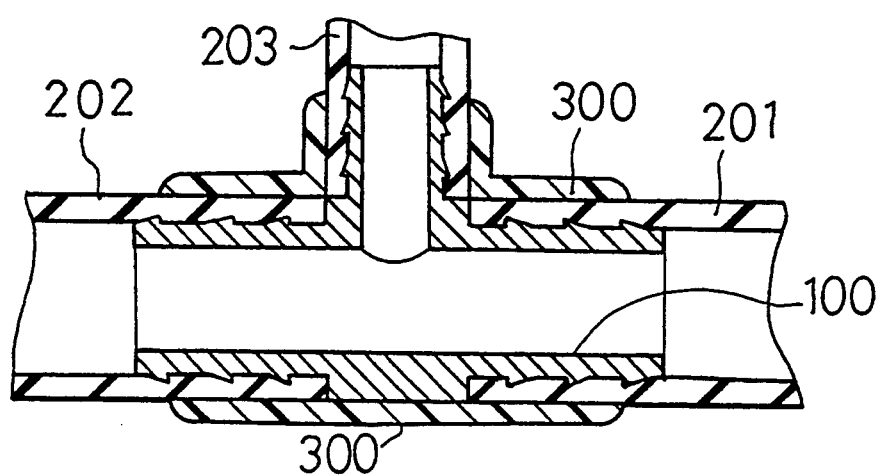
FIG. 16 is a cross sectional view of the conventional branched hose.
Figure 17:
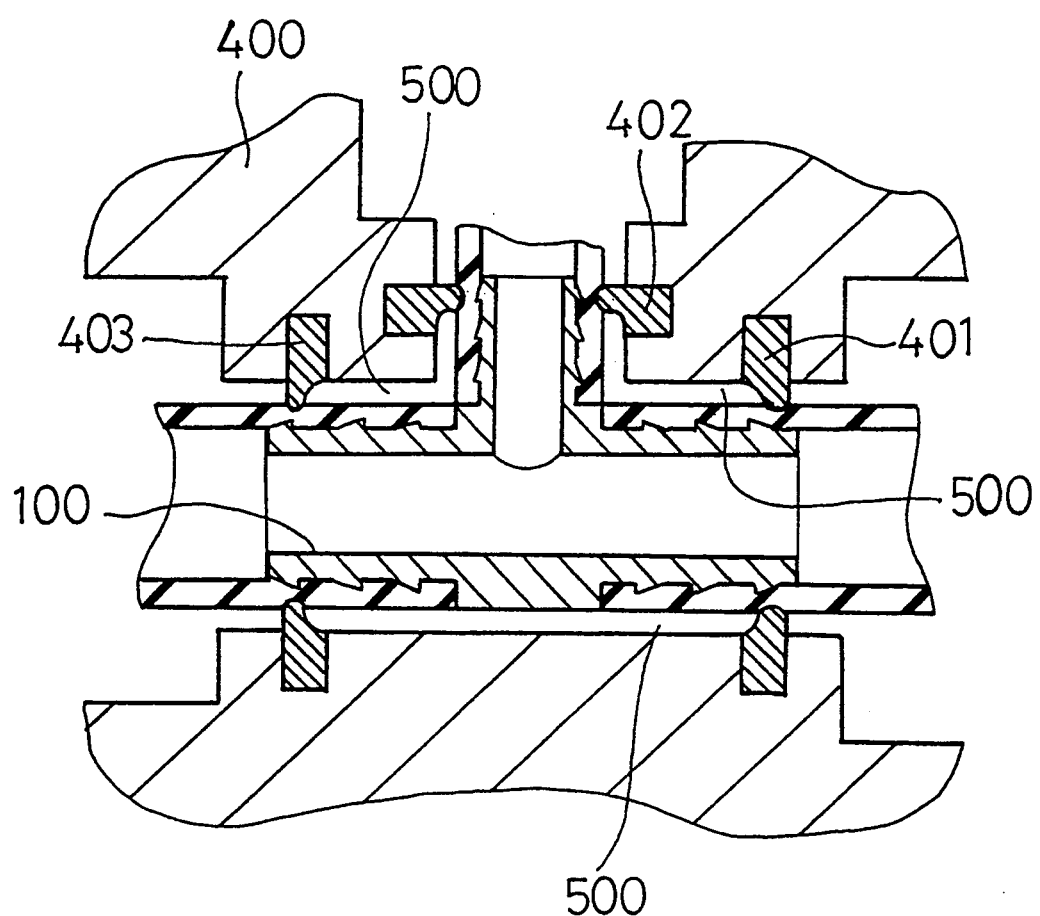
FIG. 17 is an explanatory cross sectional view for illustrating the conventional process for producing the conventional branched hose.

In a part of the mold 3, as illustrated in FIG. 15, there is formed a plate-shaped narrow passage 33 communicating with the cavity 3 and a cylindrical recessing portion 34 continuing from the narrow passage 33. The narrow passage 33 has a width of 4 mm, a length of 1 mm and a thickness of 0.8 mm. The narrow passage 33 and the recessing portion 34 are connected through an intermediate passage 35 which includes a tapered surface 35a formed on the lower mold half and tapered from narrow to wide in the direction away from the narrow passage 33 as illustrated in FIG. 15. Further, a pressure sensor 36 is disposed on a part of the cavity 31 as illustrated in FIG. 14, and it detects the pressure of the molding material in the cavity 31.

Nylon 6, 6 containing glass fiber in an amount of 15% by weight is injected into the mold B constructed as described above. The sealing pressure exerted between the sealing rings 4 and the hoses 2 are set at 30 kg/cm² approximately because it has been known that the flashes occur on the resin coating portion when the pressure of the molding material exceeds 30 kgf/cm² in the cavity 31. Also, t has been known that the short shot failures occur when the pressure of the molding material is lower than 5 kgf/cm² in the cavity 31.

Preliminary Experiment

In order to determine the thickness of the narrow passage 33, a variety of the narrow passages 33 was formed in a variety of thickness and the injection molding operations were carried out with the molds having the variety of the narrow passages 33. The following facts were found out through this preliminary experiment: When the thickness of the narrow passage 33 is less than 0.5 mm, the molding material enters the narrow passage 33 after the pressure of the molding material exceeds 30 kgf/cm² in the cavity 31. When the thickness of the narrow passage 33 is more than 1.0 mm, the molding material enters the recessing portion 34 through the narrow passage 33 before the pressure of the molding material reaches 5 kgf/cm² in the cavity 31. Hence, the thickness of the narrow passage 33 is set at 0.8 mm, and the first minimum pressure of the molding material, enabling the molding material to pass through the narrow passage 33, is set so that it is less than the sealing pressure exerted between the sealing rings 4 and the hoses 2, e.g., 30 kgf/cm², and it is set so that it is more than the second minimum pressure of the molding material, enabling to inhibit the short shot failures, in the cavity 31 of the mold 3, e.g., 5 kgf/cm².

Connecting Step

As can be understood from FIG. 14, the hoses 2 are disposed around each of the branched sleeves of the pipe in an identical manner with that of the First Preferred Embodiment, and accordingly it will not be described in detail herein.

Molding Step

The insert assembly 10 constructed in the same manner as that of the First Preferred Embodiment is disposed in the mold 3. Then, the mold 3 is clamped, and thereby the insert assembly 10 is retained and fixed with the sealing rings in the mold 3- Thereafter, the molten molding material is injected into the cavity 31 through the gate 32. The capacity of the cavity 30 equals 30 grams of the molding material, however, 35 grams of the molding material is injected into the cavity 31 in the Fifth Preferred Embodiment. The molding material hardly passes through the narrow passage 33 until it fills the cavity 31 completely. After the cavity 3 is filled up with the molding material, the pressure of the molding material is increased because the excessive molding material is injected. When the pressure of the molding material exceeds the first minimum pressure of the molding material, enabling the molding material to pass through the narrow passage 33, the excessive molding material enters the recessing portion 34 before it leaks between the sealing rings 4 and the hoses 2. As a result, the short shot failures are securely inhibited from occurring and the flashes are reliably inhibited from occurring on the resin coating portion by these operations of the Fifth Preferred Embodiment.

In the Fifth Preferred Embodiment, the resulting molded body is provided with a convex portion which is formed by the narrow passage 33 and the recessing portion 34. However, the convex portion can be removed with ease by manually breaking the thin plate-shaped portion which is formed by the narrow passage 33.

Hence, in accordance with the Fifth Preferred Embodiment of the present production process, even when the capacity of the cavity 31 is varied by the fluctuations in the dimensions of the hoses 2 or the like, the variation of the cavity 31 capacity can be offset within the capacity size of the recessing portion 34. In addition, since the flashes are reliably inhibited from occurring on the resin coating portion, the molding step can be carried out with the excessive injection capacity. Consequently, the short shot failures are securely inhibited from occurring.

Having now fully described the present invention, it will be apparent to one of ordinary skill in the art that many changes and modifications can be made thereto without departing from the spirit or scope of the present invention as set forth herein including the appended claims.

What is claimed is:

1. A process for producing a hose having a connecting portion, comprising the steps of:
   connecting a hose and a pipe by inserting an end of the pipe into the hose;
   providing an injection mold, the mold comprising mold halves, one of the mold halves including a first sealing member disposed on a molding surface thereof and another one of said mold halves including a second sealing member disposed on a molding surface thereof, the first sealing member and the second sealing member each having mating surfaces and being capable of forming a sealing ring adapted for holding and sealing around an entire periphery of said hose when they are combined;
   disposing said pipe with said hose connected in said mold such that said first sealing member retains said hose;
   combining said first sealing member and said second sealing member such that said sealing ring is formed, whereby mating surfaces of said first sealing member and said second sealing member deviate from the center of said sealing ring toward said second sealing member thereby inhibiting the hose from being pinched by the mating surfaces; and
   injection molding a resin coating portion integrally coating a connecting portion between said hose and said pipe.

2. The process for producing a hose having a connecting portion according to claim 1, wherein said first sealing member is formed in a linear shape extending in a combining direction adjacent to a mating surface, and said second sealing member is formed in a shape continuing smoothly from the linear shape of said first sealing member adjacent to the mating surface.

3. The process for producing a hose having a connecting portion according to claim 2, wherein an overall configuration of said sealing ring is formed by said first sealing member and said second sealing member in a shape including a pair of parallelly disposed linear portions and a pair of arc portions connecting said linear portions.

4. The process for producing a hose having a connecting portion according to claim 1, wherein said mold further comprises a narrow passage communicating with a cavity of said mold and a recessing portion communicating with the cavity of said mold by way of the narrow passage, and a first minimum pressure of a molding material, enabling the molding material to pass through the narrow passage, is set so that it is less than a sealing pressure exerted between said sealing ring and said hose and it is more than a second minimum pressure of the molding material, enabling to inhibit short shot failures, in the cavity of said mold, whereby evacuating an excess of the molding material to the recessing portion by way of the narrow passage after the cavity of said mold is filled completely.

5. A process for producing a hose having a connecting portion, comprising the steps of:

connecting a hose and a pipe by inserting an end of the pipe into the hose;

providing an injection mold, the mold comprising mold halves, one of the mold halves including a first chucking member and a first sealing member disposed on a molding surface thereof and another one of said mold halves including a second chucking member and a second sealing member disposed on a molding surface thereof, the first sealing member and the second sealing member each having mating surfaces and being capable of forming a sealing ring adapted for holding and sealing around an entire periphery of said hose when they are combined, and said first and second chucking members each having mating surfaces, each including a polygon-shaped concave portion and being adjacent and outside the sealing members;

disposing said pipe with said hose connected in said mold;

clamping said mold halves together thereby forming said sealing ring and pressing said hose radially, inwardly and locally in a peripheral direction with said chucking members thereby firmly retaining said hose whereby the hose is inhibited from being pinched by said first and second chucking members; and injection molding a resin coating portion integrally coating a connection portion between said hose and said pipe.

6. The process for producing a hose having a connecting portion according to claim 5, wherein corners of said polygon-shaped concave portions are positioned at mating surfaces of said first chucking member and said second chucking member.

7. The process for producing a hose having a connecting portion according to claim 5, wherein said polygon-shaped concave portions of said first chucking member and said second chucking member are disposed asymmetrically so that the center of them deviates from the center of said chucking member oppositely with respect to a working direction of injection pressure in said molding step.

8. The process for producing a hose having a connecting portion according to claim 5, wherein said mold further comprises a narrow passage communicating with a cavity of said mold and a recessing portion communicating with the cavity of said mold by way of the narrow passage, and a first minimum pressure of a molding material, enabling the molding material to pass through the narrow passage, is set so that it is less than a sealing pressure exerted between said sealing ring and said hose and it is more than a second minimum pressure of the molding material, enabling to inhibit short shot failures, in the cavity of said mold, whereby evacuating an excess of the molding material to the recessing portion by way of the narrow passage after the cavity of said mold is filled completely.

* * * * *